United States Patent [19]

Jakobsen

[11] 3,928,711
[45] Dec. 23, 1975

[54] MANIFOLD SYSTEM FOR RENEWING CABLE PRESSURE AND VALVE ARRANGEMENT THEREFOR

[75] Inventor: William J. Jakobsen, Farmingdale, N.Y.

[73] Assignee: Lourdes Industries, Inc., Hauppauge, N.Y.

[22] Filed: June 27, 1974

[21] Appl. No.: 483,897

Related U.S. Application Data

[60] Division of Ser. No. 364,076, May 25, 1973, abandoned, which is a continuation-in-part of Ser. No. 355,759, May 30, 1973.

[52] U.S. Cl................. 174/11 R; 137/608; 251/333
[51] Int. Cl.²........................................ H02G 15/28
[58] Field of Search................. 174/11 R, 15 C, 37; 137/540, 561 A, 608, 614.02; 251/332, 333

[56] References Cited
UNITED STATES PATENTS

| | | | |
|---|---|---|---|
| 3,234,964 | 2/1966 | Tinsley et al. | 137/608 |
| 3,811,470 | 5/1974 | Schaefer | 137/54 D |

OTHER PUBLICATIONS

Bell System Practices, Plant Series, Section 637-05-0-100, Feb. 1966, pp. 1-3.
Bell System Practices, Plant Series, Section 637-05-0-200, Mar. 1966, pp. 1-6.

*Primary Examiner*—Arthur T. Grimley
*Attorney, Agent, or Firm*—Roberts & Cohen

[57] ABSTRACT

A communication system comprises a central station including a source of pressurized air with a plurality of underground cables extending from this station and coupled to said source whereby to be supplied with pressurized air to prevent the penetration of moisture and the like. An airline is coupled to the source of pressurized air and extends adjacent the cables. Manifolds are provided in the airline at positions spaced therealong. Connecting hoses or lines extend from the manifolds to respective of the underground cables to replenish the pressure in these cables. Check valves are provided in the connecting hose to prevent reverse flow from the underground cables into the manifold. Each check valve is responsive to an excess of pressure in the associated underground cable relative to the pressure in the corresponding connecting hose to seal off the underground cable with respect thereto. Each check valve includes a poppet member urged by a spring against a seat, the poppet member including a plastic inset to provide for ready sealing off of the associated underground cable. The check valve is responsive to an excess of pressure in the range of ¼ to 10 psig, preferably centered at about ½ ± ⅛ psig. The connecting hoses are preferably armoured hoses to prevent damage thereto. The armoured hoses have proximal ends adjacent the manifold and distal ends adjacent the underground cable. The valves are connected at the distal ends of the armoured hose.

28 Claims, 8 Drawing Figures

MANIFOLD SYSTEM FOR RENEWING CABLE PRESSURE AND VALVE ARRANGEMENT THEREFOR

OTHER APPLICATIONS

This application is a division of my earlier Application Ser. No. 364,076 filed May 25, 1973 (now abandoned) which was a continuation-in-part of my earlier Application Ser. No. 355,759, filed May 30, 1973 and which were all assigned to the same assignee.

FIELD OF INVENTION

This invention relates to communication systems and more particularly to communication systems employing cables into which is introduced a pressure medium in order to avoid the penetration of moisture, water and the like. The invention is moreover related to manifold systems for renewing cable pressure at spaced positions therealong and is, as well related to check valve arrangements for preventing pressure losses in the systems supplying pressurized cables and for preventing leakage in one cable from causing the escape of pressurized medium from other of the pressurized cables.

BACKGROUND

Communication systems and particularly telephone systems are known wherein cables are maintained under pressure to prevent the penetration of moisture, water, chemicals and so forth which corrosively affect the conductors contained within the cables. The technique of supplying a pressure medium to such cables has been in practice for many years and has been effective to achieve the desired result of preventing damage to conductors in underground cables, subscriber lines and the like. Systems of this type are, for example, described in Cable Maintenance Handbook issued December 1970 by Operating Staff Plant, N.Y. Telephone Co.

A system is furthermore described in the above-indicated publication whereby cable pressure are boosted at selected manholes along an underground cable route by utilizing manifolds to pass pressure to through the individual cables, the manifold being connected to or inserted in a parallel aluminum lined polyethylene pipe which carries pressurized dry air from an air dryer and compressed air source in a central office.

The flow resistance of the polyethylene pip is believed to be so low that a typical pressure drop is only two to three psi at a distance of several miles from the central office. The relatively high initial pipe pressure and the high available flow through the pipe produces, in effect, a dry air source at each manifold location.

Many disadvantages have been found in the known systems which have led to the conclusion that such systems are susceptible of great improvement. For example, it has been found that there is a relatively high pressure drop at or around the manifolds and between the manifolds and the associated underground cables, this drop constituting one of the undesirable characteristics of the known systems.

More particularly, in the known sytems an automatic shut-off valve is provided at the upstream end of each manifold which provides for supplying pressurized medium through the manifold when the pressure supplied too the valve is in excess, for example, of 6.3 psi. This valve closes at 6.0 psi. It introduces deficiencies into the system which will be discussed in greater detailed hereinafter. In addition, the manifold design which has heretofore been employed introduces further deficiencies into the system as will be also discussed in greater detail hereinafter.

One of the basic deficiencies of the known type of system described generally hereinabove is its inadequate flow capability. In this system, there are many and varied points of interference with or reduction of flow which prevents an adequate supply of pressurized medium or compressed air to the cables which are to be maintained under pressure.

A further deficiency of the known systems is that the manifolds employed therein are limited to a certain number of lines for purposes of distribution and no accommodation is made for the possibility that a greater number of cables may have to be serviced.

Still another disadvantage of the known systems is that the valve employed in association with each manifold is of the diaphragm type and therefore introduces into the system the possibility of water leakage to the supplying system from a leaking cable to the supplying system upon failure of a diaphragm. This means that the entire system can be contaminated upon the failure of a single cable. This which constitutes an intolerable objection to the design of the systems presently in use.

Still another objection to the known systems is that they include a manifold distribution arrangement wherein an individual manual control is provided for each line depending therefrom. This introduces the possibility of freeze ups due to corrosion which in turn increases the amount of servicing required and increases the difficulty in servicing such manifold system.

Still another objection to the previously known type of system is that it employs plastic tubing between each manifold and the associated cables. This type of tubing is known to detach itself easily from the associated manifold and is also known for being easily broken due for example, to water main breaks, solder burns, being stepped on or being otherwise burned, weakened or damaged. The use of such tubing adds greatly to the amount of servicing required and is therefore undesirable especially in view of the fact that underground systems are difficult to service and require an excessive amount of man hours and labor and the like.

Another objection to the known type of system is that the lines connecting each manifold with the associated cables are interconnected through the manifold with a cross-feed between cables being possible. This cross-feed between cables enables a leaking cable which is being supplied from a manifold, to draw upon the pressure medium being supplied to other of the cables in the group or actually to draw pressure medium from within the other cables associated therewith. Thus, protection of the other cables in the group may be lost by damage to a single cable.

In the previously known system, it is possible as has been noted to lose the use of all cables due to the damaging of a single cable in the group. This is an intolerable situation inasmuch as, although alarm systems are provided, it frequently takes many hours and sometimes days to locate the cable which has suffered damage and to get maintenance or service personnel to the zone of damage for purposes of repairing the same.

Actually, the known type of system depends fully upon the use of alarms to indicate that damage had occurred and, as has been noted, this is not of sufficient protection because it is still necessary after an alarm has been detected to get to the cable defect.

SUMMARY OF INVENTION

It is an object of the invention to provide improved manifolding and pressurized systems operative in connection with communication systems involving underground cables, subscriber cables, trunk cables, long-line cables, coaxial cables and the like.

Another object of the invention is to provide improved manifolding and valve systems for cables of the type intended to be subjected to a pressurized medium in order to avoid the penetration of moisture, water, chemicals and other corrosive fluids and contaminants and the like.

Still another object of the invention is to provide an improved pressure system involving the use of manifolds and check valves wherein high pressure drops are avoided and wherein the desired pressure is maintained with respect to pressurized cables in order that they be afforded full protection against the penetration of various types of contaminants and corrosive materials.

Still a further object of the invention is to provide improved pressure systems wherein adequate flow capabilities are maintained and wherein very low pressure drops are experienced as between the pressure source and the end recipient of the pressurized medium involved.

A further object of the invention relates to the provision of an improved manifolding system which is not limited to a fixed number of connecting lines and in which manifolds can be employed in series with one another without any loss of flow capability or without an intolerable pressure drop.

The invention has by way of a further object the provision of a valve improvement in a manifolding system whereby the manifolding operation continues at extremely low pressure such as, for example, in the range of less than 1 psig since, as will be shown, the check valve arrangement of the invention depends upon a pressure differential between the pressure in the cable being supplied and the manifold supplying the same.

It is a further object of the invention to provide a manifolding and check valve system improved to the extent that it prevents leakage of water and moisture into cables from feeding back into the system upstream of the manifold whereby it is insured that leakage into one or more cables will not damage the associated supply system.

Yet a further object of the invention is to provide a system wherein possibilities of freeze up due to corrosion and the like are minimized.

A further object of the invention relates to the use of improved tubing for connecting manifolds and associated cables, which tubing offers a higher resistance to breakage and other types of damage which can lead to a failure of the system.

An extremely important object of the invention is to provide an improved system wherein the lines feeding respective cables from a manifold offer little possibility of cross feed so that one defective cable in a group of cables cannot draw from the pressure medium in order of the cables in the group.

Still a further object of the invention is to provide a pressurized cable system wherein the loss of one cable does not result in the loss of any of the other cables.

Yet another object of the invention relates to the provision of a system wherein little or nor reliance is placed upon associated alarm systems and wherein damage to a pressurized cable is automatically isolated from the balance of the system so that it is not necessary to detect where damage has occurred with the same urgency as is required in previously known systems.

A further object of the invention is to provide a system which expedites the locating of cable damage.

To achieve the above and other objects of the invention, there is provided a communication system comprising a central station including a source of pressurized air, a plurality of underground cables extending from this station and coupled to said source whereby to be supplied with pressurized air to prevent the penetration of moisture or the like, an airline coupled to said source and extending adjacent the cables, a series of manifolds in said airline at positions spaced therealong, connecting hoses extending from said manifold to respective of the underground cables to replenish the pressure in the same, and check valve means in the connecting hoses to prevent reverse flow from any of the underground cables into the manifold.

In further accordance with the invention, the aforesaid valve means includes in each connecting hose a valve responsive to an excess of pressure in the associated underground cable relative to the pressure in the corresponding connecting hose to seal off the underground cable.

According to a feature of the invention, the aforesaid valve means responds to a pressure differential in the range of from ¼ to 10 psig, this range preferably running from ¼ to ¾ psig and being more particularly centered at about ½ ± ⅛ psig.

According to a further feature of the invention, the connecting hoses include proximal ends adjacent the associated manifold means and distal ends to which the valves are connected, the valves being located adjacent their respective pressurized cables.

Preferably, in accordance with the invention, the hoses connecting a manifold with the associated pressurized cables are armoured hoses, the reason for this being that these armoured hoses will resist damage or breakage due to water main breaks, solder burns, being stepped on and the like.

According to still a further feature of the invention, the manifolds or manifold means include inputs and outputs operatively associated therewith permitting the unregulated flow of pressure medium into and out of the manifolds.

According to a feature of the invention, the manifold preferably includes a primer coating of epoxy polyamide and a coating of polyurethane on the primer coating. The reason for this is that the manifolds of the type under consideration are generally located in manholes whereat they are subjected to corrosion and destruction or damage and the purpose of such coatings is to prevent damage and to minimize the servicing which is required.

According to one embodiment of the invention, the valves employed for performing a check valve function may include two perpendicularly related sections, one of which is connected at right angles to the associated pressurized cable. In another embodiment of the invention, the valve may extend in generally straight form from the associated cable.

According to another aspect of the invention, the check valve employed in accordance therewith comprises a valve body provided with a bore extending therethrough, said bore having an enlarged chamber at one end thereof, a member provided with a bore, and fixed in said chamber to confine an inner chamber therein, said bore and inner chamber cooperatively forming a flow passage, a poppet in said inner chamber, said member including a seat protruding towards said poppet and encircling the bore in said member, said poppet including a poppet body and a poppet inset in said poppet body, said inset having a hardness of 50–80 on the Durometer A scale and being adapted to engage said seat, and a spring in said inner chamber urging the poppet and thereby the inset against said seat whereby to cut off flow through the flow passage.

According to a feature of the invention, said inset is of a fluoroelastomer and has a hardness of 70–80 on the Durometer A scale. This inset is particularly adapted to cooperate with the seat in the form of a circular rim having a thickness in radial direction of 0.005 –0.010 of an inch. Moreover, according to an aspect of the invention, the aforesaid poppet body may include a circular skirt at least in part encircling the aforesaid spring, the poppet body being provided with a plurality of symmetrically arranged inclined bores positioned in concentric array relative to the aforesaid skirt.

The valve employed in accordance with the invention will be mainly of metal and may also preferably comprise a primer coating of the epoxy polyamide on the valve body and a coating of polyurethane on the primer coating.

Other objects and features as well as further advantages of the invention will be found in the detailed description which follows hereinafter and which is illustrated in the accompanying drawing.

DETAILED DESCRIPTION

Telephone systems and other types of communication systems involving the use of underground cables and subscriber plants have for many years been plagued with ever increasing maintenance costs and labor expenditures as a result of cable failures in these underground trunks and subscriber plants.

A primary cause contributing to failures in the known systems has been inadequate cable protection resulting from a lack of air pressure or flow performance capability or supply.

It has now been discovered in accordance with the invention that a modified system can provide greatly increased operational performance, higher reliability and reduced maintenance. Of paramount importance in the system provided in accordance with the invention is the fact that in the event of a failure of the air supply from an associated central office, a fail-safe protection is provided by means of a check valve which insures that the desired pressure will remain in the various associated underground cables.

In investigating the prior art, it was found that the basic air pressure flow piping system and related installations relative to cable pressure protection and water penetration was marginal or ineffective under normal operating conditions. The cause of the poor characteristics were attributed primarily to limited air flow capabilities and excessive pressure loss. This in turn resulted from high air leakage rates, reduced cable pressure and increased water penetration susceptibility. Furthermore, deficiencies of the known systems also resulted from additional compressed air load requirements, corrosion and galvanic vulnerability, physical damage and total system performance degradation.

Due to practical limitations in insuring pressure tight joints in underground cable installations, these underground cable installations require free-flow air-pressure operational supply systems. It thus becomes essential to optimize all piping or manifold distribution and hardware components for maximum flow and minimum pressure drop. The provisions of the present invention relative to the above provide, with respect to known systems, a flow rate increase in excess of 300%, a pressure drop decrease in excess of 50%, and a galvanic or corrosion protection which is at least 300% greater than in previously known systems. The present invention moreover provides a check valve control with more leakage reverse flow and a physical damage susceptibility which is close to optimum. The reliability of the system provided in accordance with the invention is great and the life endurance of the system exceeds all present requirements. Prototype systems of the present invention have been installed under test conditions and have been evaluated at extremely high levels of proficiency and acceptability.

In accordance with the present invention, air under pressure enters a manifold and is distributed or channeled through a stainless steel braided Teflon tube to a low cracking check valve mounted on a pressurized cable. The low cracking check valve operates, for example, at 0.6 ± 0.20 psig.

The check valves employed in accordance with the invention are initially opened when the supplying air pipe pressure reaches 0.6 psig (generally referred to hereafter as ½ psig which may be considered to be the target pressure). The check valves of the invention allow dry free flowing air to enter each pressurized cable.

The pressurized cables continue to receive air flow and increases in pressure to a maximum, for example, of 10 psig minus any flow loss due to pneumatic resistance in the system. When the pressurized cables reach this maximum state (i.e. the pressure of the source), they are said to be stabilized and will remain as such unless one or any combination of the following defects occurs:

1. A break, crack or similar damage to a transmission or pressurized cable.
2. A break, crack or similar damage to armoured tubing between the manifold and check valve or
3. A break, crack or similar damage to the supply pipe supplying the manifold.

If the condition occurs whereby damage is suffered by a pressurized cable, the pressurized cable will demand increased flow through its check valve. The pressurized cable can draw to the capacity of the air supply. A cut cable could demand a flow that could cause the air pipe pressure to drop and want to draw from its neighboring cables. If the air pipe pressure rapidly drops, due to this particular type of damage, by approximately ½ psig, all other transmission cable check valves will close. The check valves will reopen if either the air pipe pressure rises by ½ psig or the transmission or pressurized cables drop by ½ psig. The closing of the check valves assures against rapid loss of neighboring cable pressurization and allows a damaged cable to receive all of the air pipe flow available. In most cases, the high-flow check-valve system will maintain adequate pressurization until the damaged cable can be identified and repaired.

The other two conditions mentioned hereinabove will cause a similar reaction except that all transmission cables will have closed check valves if the air-pipe pressure drops by ½ psig.

Figure 1:
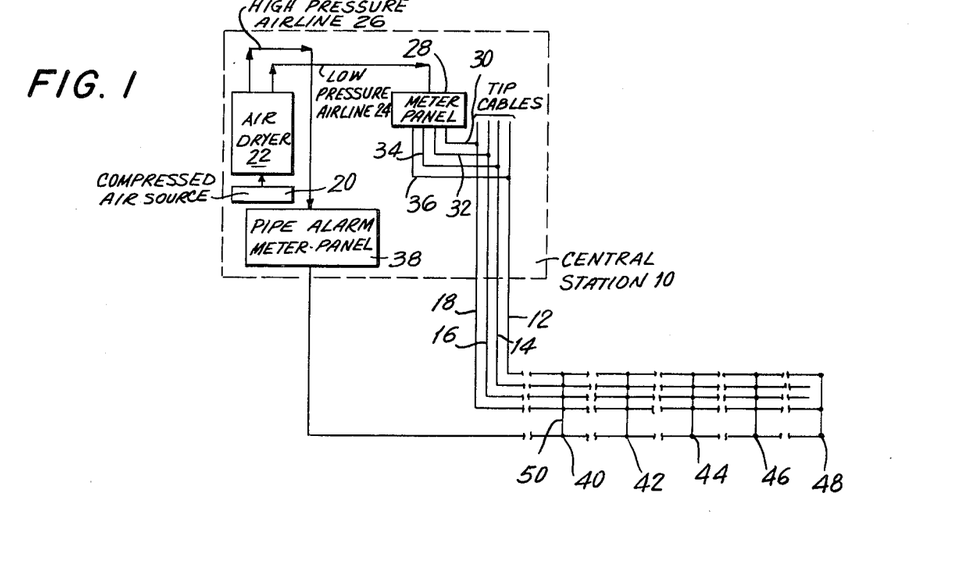
FIG. 1 is a schematic diagram of a known pressurized cable system originating in a central station and forming a basis for the improvements of the invention.

In FIG. 1 is illustrated a central station 10, from which extend a plurality of pressurized cables diagrammatically indicated at 12, 14, 16 and 18.

The central station 10 includes a compressed air source 20 feeding into an air dryer 22. From the air dryer 22 extend a low pressure airline 24 and a high pressure airline 26. The low pressure airline 24 extends into a meter panel 28 which manifolds the pressure medium therein via lines 30, 32, 34 and 36 into the aforesaid pressurized cables 12, 14, 16 and 18.

Outside of the central station 10, the cables 12, 14 16 and 18 extend underground along a given cable route. The high pressure airline 26 extends through a pipe alarm meter panel 38 and follows a route generally parallel to that of the aforesaid cables 12, 14, 16 and 18.

At spaced positions along this route, respective of a series of manifolds indicated generally at 40, 42, 44, 46 and 48 are provided in spaced series. These manifolds may be spaced, for example, at a distance of 3,000 feet from one another and are generally located in manholes for purposes of servicing and otherwise.

These manifolds feed the aforesaid cables 12, 14, 16 and 18 through lines indicated generally and by way of example at 50. The purpose of this is to renew the pressure in these cables along the route thereof so that an adequate pressure is maintained therein to avoid the penetration of moisture, water and other liquids and chemicals and the like which may harmfully effect the electrical conductors contained within these cables. The basic problem with which the invention is concerned is to provide for appropriately manifolding compressed air or other such pressurized medium to the underground cables and to provide for protection against the result that the loss of a single cable might possibly damage the other cables or provide access for corrosive substances into the overall system.

Figure 2:
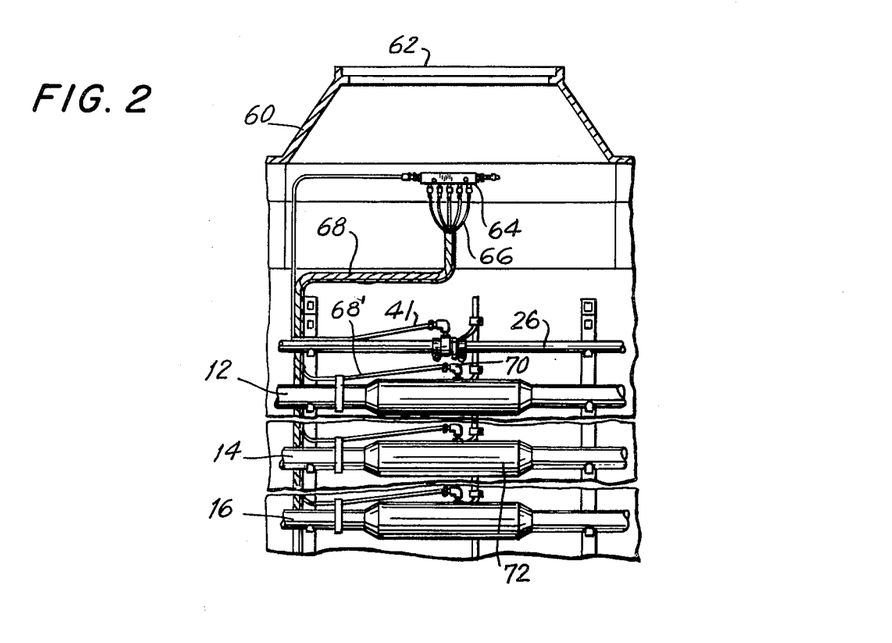
FIG. 2 is a simplified pictorial view of a manifolding system employed in accordance with the invention.

FIG. 2 generally indicates a manifolding operation generally known to the prior art but further improved in accordance with the invention. In FIG. 2 is seen a manhole 60 with a manhole cover 62 and with a plurality of cables (as have been noted above) of which cables 12, 14 and 16 are visible. Airline 26 also appears in FIG. 2 along with its feeder line 41.

Feeder line 41 is connected to a manifold 64 from which depend a plurality of connecting lines 66. These connecting lines 66 pass in a bundle 68 in a direction towards the aforesaid cable and the individual connecting lines include sections 68 which are connected to enlarged sections 72 of the respective cables.

Figure 3:
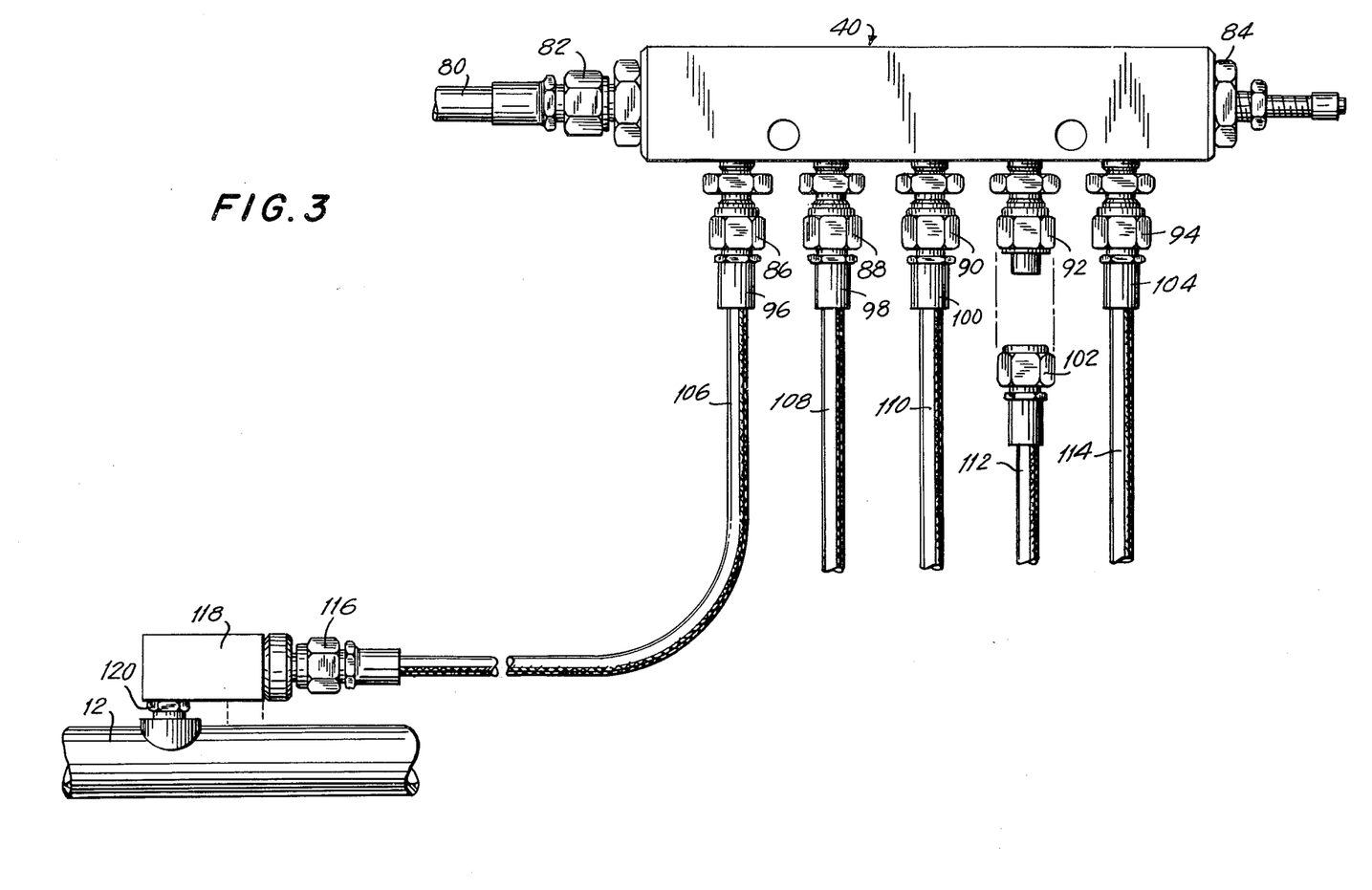
FIG. 3 is a side view of a manifolding system showing the input thereto as well as the outflow therefrom, portions of the outgoing hoses being broken away for purposes of clarity.

FIG. 3 at 40 illustrates by way of example the manifolds 64 referred to hereinabove. Also illustrated is an input line 80 which constitutes an input into the manifold 40 and caps a supply of compressed air from the associated airline referred to hereinabove with respect to FIGS. 1 and 2 at 26. The manifold 40 includes an input fitting 82 and an end cap 84. The manifold 40 can be connected in series with one or more like manifolds connected to the manifold 40 by means of a coupling fitting substituted for the end cap fitting 84.

Depending from the manifold 40 are a plurality of output fittings 86, 88, 90, 92 and 94. The end fittings 96, 98, 100 102 and 104 of armoured hoses 106, 108, 110, 112 and 114 are connected to the output fittings. The ends of the armoured hoses to which the fittings 96-104 are connected are considered as being the proximal ends of the armoured hoses. That is, they are the ends of the hoses which are next adjacent the associated manifold.

The distal ends of the various hoses are provided with fittings such as indicated at 116. These, in turn, are connected to check valves 118. The constructions of the manifold 40, the hoses 106-114 and check valves 118 will be described in greater detail hereinafter. At this time, it is sufficient to note that the check valve 118 is connected by a fitting 120 to the associated cable (i.e. cable 12 referred to hereinabove).

The cable 12 is a cable which internally accommodates a plurality of electrical conductors and which includes an external cover or sheath which is capable of retaining therein a pressurized medium such as compressed air. Such a cable is discussed, for example, in the Cable Maintenance Handbook referred to hereinabove. These cables are well known and the details thereof are readily available and are known to those skilled in the art.

The manifold 40 as will be shown is provided with an unregulated input and an unregulated output and is internally designed to minimize the resistance of air flow and distribution therethrough. Armoured hoses 106-114 are particularly strong and respectively adapted to resist the type of damage which might be suffered in underground installations due to servicing personnel or environmental conditions. The check valve 18 is operative upon a pressure differential between, for example, the cable 12 and the armoured hose 106 or manifold 40 of 0.5 or 0.6 psig. Thus, when the pressure in the cable 12 is higher than the pressure in the armoured hose 106 by the specified amount, the valve 118 prevents the reverse flow of pressure medium back into the hose 106 and thus into the manifold 40. This is a very important feature of the invention for the reasons mentioned hereinabove. Due to the use of check valves on each of the armoured cables 106-114, the hoses cannot be interconnected with one another through the manifold 40 when one of the underground cables suffers damage because a reduction of pressure at the manifold 40 or in any of the various cables connected to "healthy" underground cables will cause the associated check valves to operate thereby isolating the healthy cables from the damaged cables. As a result, the serviceability of the healthy cables is maintained. At the same time, the entire output of the manifold 40 is directed to the damaged cable and, provided that the damage is not too extensive, the output of the manifold 40 will generally be sufficient to maintain the damaged cable in adequately pressurized condition.

As a result of the above, the system of the invention, will seldom, if ever, suffer the deficiency of having inadequate flow capabilities. Furthermore, the penetration of moisture, water or other contaminants into the manifold system and upstream thereof is reduced due to the fact that increased pressure is being supplied in the direction of the damaged cables. Moreover, it will be seen, as generally indicated hereinabove, that it is not possible to interconnect a damaged line with any of the undamaged lines or to generate a cross-feed therebetween because of the operation of the various check valves. It is thus clear that, contrary to prior systems wherein the possibility existed of losing all cables at one time, this possibility is prevented by the arrangement of check valves and an associated manifold in accordance with the invention. Furthermore, it is obvious that whereas prior art systems depended directly on alarms, the present invention avoids this weakness since it tends to compensate cable damage until such damage is repaired. It will also be seen hereinafter, that the system of the invention minimizes pressure drops and minimizes damage or defects due to connecting hose failures due to breakage, breaking, mechanical forces and the like.

Figure 4:
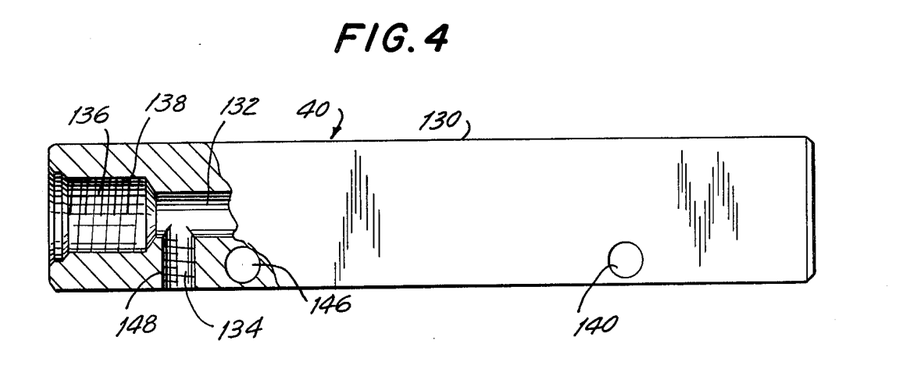
FIG. 4 is a side view of a manifold, partially broken away, employed in accordance with the invention.

FIG. 4 is a partially sectional view of the manifold 40 wherein it can be seen that this manifold is of uncomplicated internal design especially intended for minimizing pressure drops in the manifolding system. More particularly, the manifold 40 includes a parallelopiped body 130 having a square cross section and provided with a longitudinal bore 132. From the bore 132 depend a plurality of outlet bores 134, these being regularly spaced along the length of the manifold. At both ends of the body 130 are provided enlarged chambers 136, these being threaded as indicated at 138. The illustrated chamber 136 is the input chamber of the manifold. It receives and accommodates the fitting of the input line connected to the manifold.

As will be discussed hereinafter, the body 130 is preferably fabricated from 316 stainless steel. The nature and purpose of this will be indicated hereinafter. In addition, the manifold 40 is provided with a particular synthetic coating, the purpose of which is to minimize corrosion as might otherwise result from the environment in which such manifolds are generally installed.

With reference to the installation of the manifold 40, it will be noted by way of example that the body 130 may be provided with transverse bores 140 and 146 which serve the purpose of enabling the passing of fastening members through the manifold for attachment to a fixed structure within the associated manhole.

It will be noted that the outlet bores 134 are each provided with internal threads 148, the purpose of which is to permit the insertion of outlet fixtures. By way of illustration, the diameter of longitudinal bore 132 is in the illustrated example 0.400 inches while the diameter of the outlet bores 134 is about 0.312 of an inch which is reduced effectively to about 0.170 of an inch with a fitting subsequently inserted. This provides a ratio of outlet bore to longitudinal bore which is somewhat greater than would be expected. However, the effective diameter of outlet bores 134 is reduced by the insertion therein of outlet fixtures. The end result is that the outlet flow from the manifold 40 can be more than adequately serviced by the longitudinal bore 132. The intention is that while a simple internal construction is provided relative to the various bores, the longitudinal bore 132 should not appear as a canstriction providing an excessive pressure drop in the system.

Figure 5:
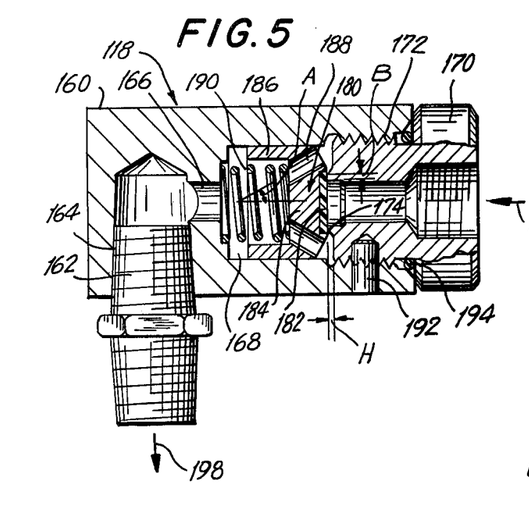
FIG. 5 is a side view of a check valve employed in accordance with the invention and as is also seen in FIG. 3, the valve construction of FIG. 5 being shown partially broken away and in section to reveal the inner details thereof.

FIG. 5 illustrates one form of check valve 118 which may be employed in accordance with the invention. In FIG. 5, is seen the valve body 160 which like the manifold 40 discussed hereinabove is preferably made of a stainless steel and preferably of 316 stainless steel as will be discussed hereinafter. Also, as with the manifold 40, the body 160 is provided with a synthetic coating which will be described hereinafter.

The valve 118 effectively consists of the body 160 and a fitting 162 which extends at a right angle thereto and extends perpendicularly into the associated cable. The fitting 162 is threadably engaged as indicated by the threading 164.

A bore 166 extends longitudinally through the body 160. It widens into a chamber 168 which is limited as an interior chamber by means of the end cap member 170 which threadably engages a corresponding thread provided in the body 160 as appears as 172.

The end cap member is provided with a circular rim indicated at 170. This rim constitutes the seat upon which the associated poppet section of the valve performs its cut off function. The rim 174 has a breadth in radial direction indicated at B of 0.005 – 0.010 of an inch. This dimension is rather critical for the plastic with which the seat is to cooperate as will be indicated in greater detail hereinafter. At the same time, the rim 174 has a height which is indicated at H. This height is preferably 0.015 ± 0.005 of an inch. This dimension is also rather critical to prevent the poppet from bottoming and thus being unable to properly perform its function.

Cooperating with the seat noted hereinabove is a poppet member 180 provided with a disc-like inset 182. The disc-like inset is preferably a plastic and is, more particularly, a fluoroelastomer having a hardness of 50–80 on the Durometer A scale. Preferably this hardness lies within the range of 70–30. A preferred fluoroelastomer which is employed is Viton which will be discussed hereinunder.

The poppet member 180 is provided with a body section 184 having a circular skirt 186 depending therefrom. Concentric with the axis of the poppet member and skirt 186 is a circular array of inclined bores or vents 188. These bores form an angle A of approximately 30°. This angle can vary as, for example, between 20° and 50°. The purpose of these bores is to permit the through flow of compressed air when the inset 182 is spaced from the seat constituted by the rim 174.

Accommodated within the skirt 186 is a helical spring 190. This spring is of sufficient strength to permit the operation on a pressure differential of ½ psig as noted hereinabove. The spring may be, for example, fabricated of steel.

The end cap member 170 is locked in the body 160 by means of a radially disposed pin 192. This pin may be force fit into the body 160 or may be threaded as desired. When the body 160 is of stainless steel, the pin 192 is likewise of stainless steel. Should under some circumstances, the body 160 be fabricated of brass, the pin 192 for purposes of longevity will nevertheless be fabricated of stainless steel in the preferred version of the invention.

To provide for a sealing as between the end cap 170 and the body 160, there is employed an O-ring indicated at 194. This O-ring may be fabricated, for example, of a synthetic rubber or the like.

From the description of the valve 118, which has been given above, it will be evident that should the pressure at the upstream end of the valve as indicated by arrow 196 exceed that of the downstream end as indicated by arrow 198, the poppet will be forced against the spring 190 such that inset 182 will be spaced from the rim or seat 174. This will enable the flow of compressed air through the bores 188 and then through the bore 166 and out through the fitting 162 into the associated pressurized cable. On the other hand, should the pressure within the cable exceed that on the upstream end of the valve, this reversed pressure distribution will enable the spring 190 to act against the poppet 180 to force the inset 182 against its seat and thereby to cut off flow in a direction opposite to that indicated by arrows 196 and 198.

Figure 6:
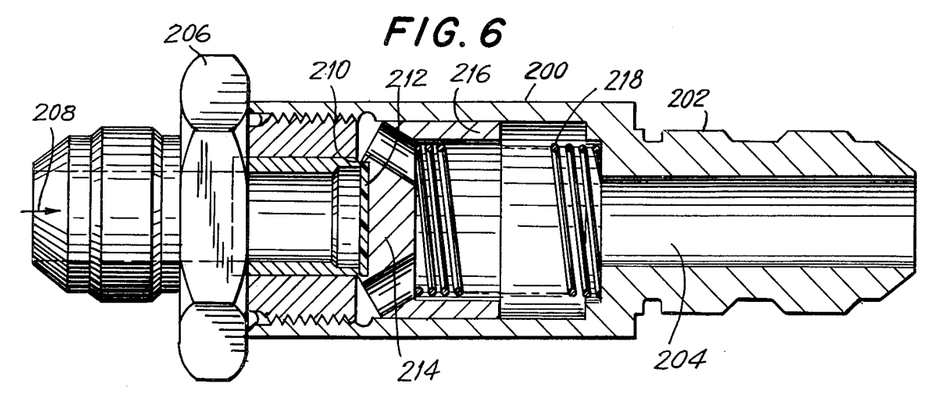
FIG. 6 is a sectional view through a check valve employed as an alternative to the check valve of FIG. 5.

In FIG. 6 appears a valve body 200 provided with an end fitting 202 and having a bore 204 passing longitudinally therethrough. An end cap member 206 is located at the input end of the valve, the normal flow through the valve being indicated by arrow 208.

Internally located within the valve, is the circular rim or seat 210 described hereinabove with respect to FIG. 5 and with which cooperates an inset 212 located in a poppet member 214. The poppet member includes a skirt 216 which encircles a holical spring 218, the nature and purpose of which have been discussed hereinabove. Flow through the valve of FIG. 6 in the direction indicated by arrow 208 is permissible as long as the upstream pressure exceeds the pressure in the associated cable by an amount greater than the strength of spring 218. Once this condition ceases to exist, such as when the pressure at the input end of the valve is decreased, as may occur when a related cable in the some group is damaged, the valve of FIG. 6 closes and prevents pressure loss from the undamaged cable on which the valve is mounted. On the other hand, should the cable associated with the valve of FIG. 6 be damaged, the flow indicated by arrow 208 will be maintained and even increased as has been described hereinabove so that the associated cable pressure will be maintained insofar as it is possible until a maintenance crew arrives.

Figure 7:
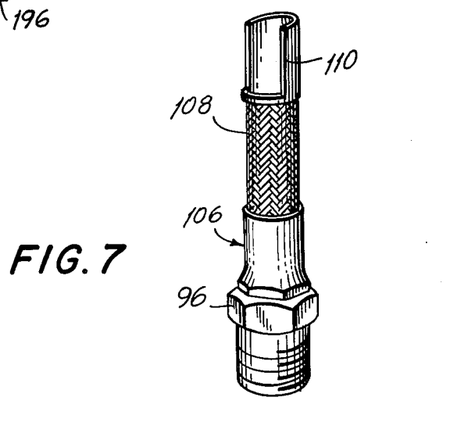
FIG. 7 is a fragmentary view of an armoured hose employed in accordance with the invention, the view showing the connection end and showing the interior construction of the hose.

FIG. 7 illustrates an armoured hose employed in accordance with the invention and indicated by way of example at 106 in FIG. 3. The hose includes an end fitting 96 and a stainless steel braid 108 encasing an inner Teflon tube 110. Such an armoured hose is available as hose R115 manufactured by Titeflex, a division of Atlas Corporation, Springfield, Mass. The specified hose can withstand fluids up to 1500 psi and can further withstand 450°F. Such hoses can generally withstand a vacuum of 25 inches of mercury at room temperature without collapse as long as a minimum bend radius is not exceeded.

The armoured hose of the invention is especially suited for avoiding damage due to water main breaks and due to mechanical forces applied thereto by maintenance personnel. It is especially important to use armoured hose in accordance with the invention to maintain optimised longevity conditions and resistance to environmental conditions such as might be consistent with the idea of minimizing maintenance requirements as regards both time and costs.

Figure 8:
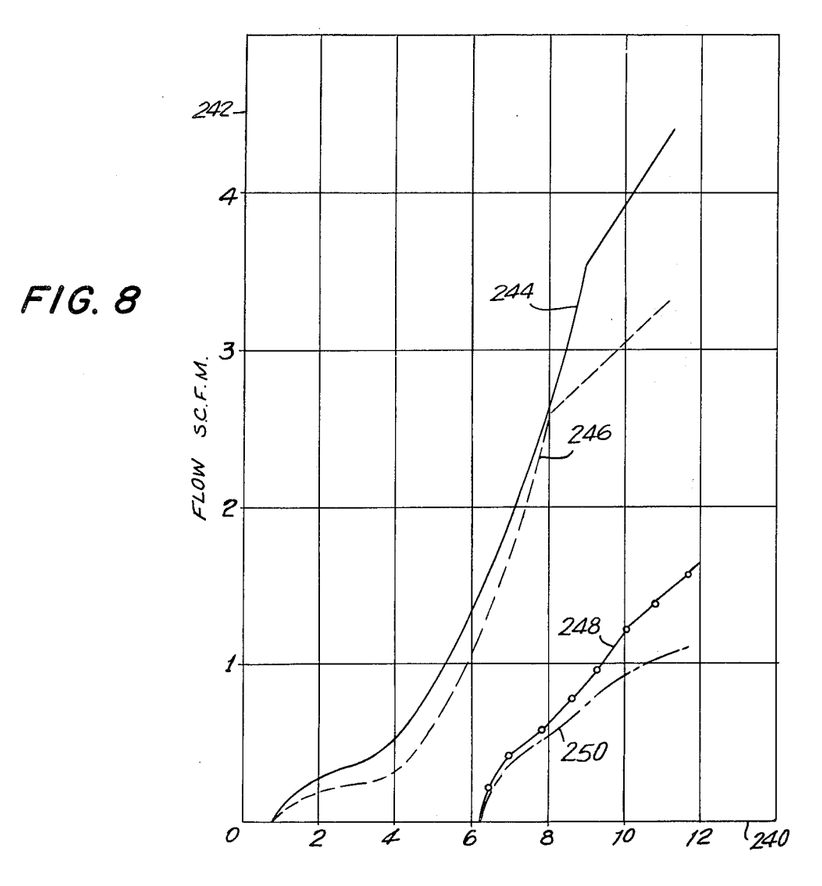
FIG. 8 is a chart showing performance characteristics of the present invention as compared with those of the prior art systems described in general terms hereinabove.

FIG. 8 is a chart showing the comparative operating characteristics of the system of the invention and the prior art. The abecissa 240 of the chart is given in $\Delta P$ psi whereas the ordinate 242 is given in units of flow (standard cubic feet per minute). Curves 244 and 246 are curves relating respectively to a plurality of lines in accordance with the invention and a single line in accordance with the invention. Curves 248 and 250 respectively represent the same conditions for the prior art.

First of all, it will be noted that the total flow capacity provided in accordance with the invention far exceeds that of the prior art. Additionally, it will be noted that the system of the prior art cuts off at 6 psi whereas the system of the invention cuts off at about ½ psi. The curves of FIG. 8 were worked up comparing the above described system of the invention with the so-called Seabek System described and illustrated in Cable Maintenance Handbook as referred to hereinabove.

As has been noted, the manifold and valve of the invention are preferably made of stainless steel and more preferably of 316 stainless steel. 316 if the AISI type number. The same may be purchased under brand name Carpenter Stainless Steel No. 316. This stainless steel has a maximum content by percentage of carbon of 0.08, a manganese maximum of 2.0, a sulphur content of 0.03 maximum, a silicon maximum of 1.0, a chromium content of 16.0 – 18.0, a nickel content of 10.0 – 14.0 and a molybdenum content of 2.0 – 3.0. The proper selection of stainless steel is written up in Machine Design, Oct. 2, 1969 under the title "Simplifying The Selection of Stainless Steels" By Samuel E. Tyson. The 316 stainless steel employed in accordance with the invention has been found to operate most appropriately in the environmental conditions to which systems of the invention will be subjected.

As has been mentioned hereinabove, the inset in the poppet member of the valves of the invention is preferably of a synthetic rubber or fluoroelastomer material having a hardness of 50–80 on the Durometer A scale and preferably a hardness of from 70–80 on this scale. The preferred material which is employed from manufacturing the inset is "Viton" manufactured by DuPont and identified as V747. As disclosed in C. Conover and Co., Inc. catalogue entitled "Viton," viton as a high performance synthetic rubber possessing exceptional heat and fluid resistance and having an excellent combination of resilience with heat, fluid and abrasion resistance. It is also resistant to flame radiation, high vacuum outgassing and ozone. It has a tensile strength of 1735 psi in its original form with an elongation of 190%. It is especially adapted to seat against stainless steel and brass valve seats which, as has been indicated above, are the preferred materials from which the valve body is made.

As a further feature of the invention, the manifold and valve bodies and associated parts are preferably provided with a special prime coating and an outer coating thereupon. The primer coating is preferably epoxy polyamide according to military specification MIL-P-23377C of Aug. 26, 1969. This specification sets forth a chemical and solvent resistant primer coating which is now found to be especially suitable for use in the type of manifolding system for which the invention is most suited.

Over the aforesaid primer coating is provided an aliphatic polyurethane coating according to military specification MIL-C-81773(AS). This specification defines a finish now found suitable for use in circumstances where corrosive action is to be avoided in underground systems such as with which the invention is concerned. This special application of the coating in connection with the instant invention provides definite and significant improvements as regards resistance to corrosion and other deterioration in underground systems.

From what has been stated hereinabove, it will now be understood that in accordance with the invention, there is provided a communication system comprising a central station including a source of pressurized air, a plurality of underground cables extending from said station and coupled to said source whereby to be supplied with pressurized air to prevent the penetration of moisture and the like, an airline coupled to said source and extending adjacent said cables, a series of manifolds in said airline at positions spaced therealong, connecting hoses extending from said manifold to respective of the underground cables to replenish the pressure in the same and check valves in the connecting cables to prevent reverse flow from any of the underground cables into the manifold.

It has also been demonstrated that the valve of the invention constitutes in each connecting hose a valve responsive to an excess of pressure in the associated underground cable relative to the pressure in the corresponding connecting hose to seal off the underground cable with respect thereto. This has the effect of isolating healthy cables from a damaged cable and to prevent cross flow therebetween through the associated manifold.

It will also appear from the above that in accordance with the invention, there is provided apparatus for connecting a source of pressure medium to at least one pressurized communication system cable, said apparatus comprising manifold means for the unregulated distribution of said pressure medium from said source to said cable and valve means coupling said manifold means to said cable and responsive to a predetermined excess of pressure in said cable relative to that in said manifold means to seal off the cable with respect to the manifold means.

There will now be obvious to those skilled in the art many modifications and variations of the constructions set forth hereinabove. These modifications and variations will not depart from the scope of the invention if defined by the following claims.

What is claimed is:

1. Apparatus comprising a source of pressure medium, a plurality of pressurized communication system cables, manifold means coupled to said source for the distribution of said pressure medium from said source, and valve means coupled between said manifold means and said cables to deliver said pressure medium from the manifold to said cable, said valve means being responsive to a predetermined excess of pressure in respective of said cables relative to that in said manifold means due to a pressure loss related to one of said cables to seal off the respective cables with respect to said manifold means.

2. Apparatus as claimed in claim 1 comprising a plurality of connecting hoses respectively connected between said manifold means and said cables, said valve means including a plurality of valves each in a respective one of said connecting hoses for coupling the same to a respective one of said communication system cables and operative in response to a predetermined excess of pressure in the associated communication system cable relative to said manifold means to seal the associated cable from the associated connecting hose.

3. Apparatus as claimed in claim 2 wherein said excess of pressure is from about ¼ to 10 psig.

4. Apparatus as claimed in claim 3 wherein said excess of pressure is from ¼ to ¾ psig.

5. Apparatus as claimed in claim 4 wherein each said valve includes two perpendicularly related sections one of which is adapted for being connected at right angles to the associated telephone communication cable.

6. Apparatus as claimed in claim 4 wherein each said valve includes a valve body provided with a bore extending therethrough, said bore having an enlarged chamber at one end thereof, a member provided with a bore, and fixed in said chamber to confine an inner chamber therein, said bores and inner chamber cooperatively forming a flow passage, a poppet in said inner chamber, said member including a seat protruding towards each poppet and encircling the bore in said member, said poppet including a poppet body and a poppet inset in said poppet body, said inset having a hardness of 50–80 on the Durometer A scale and being adapted to engage said seat, and a spring in said inner chamber urging said poppet and thereby said inset against said seat whereby to cut off flow through said flow passage.

7. Apparatus as claimed in claim 6 wherein said inset is of fluoroelastomer and has a hardness of 70–80 on the Durometer A scale.

8. Apparatus as claimed in claim 7 wherein said seat in a circular rim with a thickness in radial direction of 0.005 – 0.010 inches.

9. Apparatus as claimed in claim 8 wherein said poppet body includes a circular skirt at least in part encircling said spring and is provided with a plurality of symmetrically arranged inclined bores arranged in concentric array relative to said skirt.

10. Apparatus as claimed in claim 9 wherein said valve includes a body of metal, comprising a primer coating of epoxy polyamide on said valve body and a coating of polyurethane on said primer coating.

11. Apparatus as claimed in claim 6 wherein said inset if of Viton.

12. Apparatus as claimed in claim 3 wherein said excess of pressure is ½ ± ⅛ psig.

13. Apparatus as claimed in claim 12 wherein each said valve is so shaped as to be adapted to extend in generally straight form from the associated communication cable.

14. Apparatus as claimed in claim 3 wherein said connecting hoses are armoured hoses.

15. Apparatus as claimed in claim 3 wherein said connecting hoses include proximal ends adjacent said manifold means and distal ends to which said valves are connected, said valves being adapted for being located adjacent their respective communication system cables.

16. Apparatus as claimed in claim 3 wherein said manifold means include a manifold and input and output means operatively associated with said manifold and permitting the unregulated flow of said pressure medium into and out of said manifold.

17. Apparatus as claimed in claim 8 wherein said manifold includes a primer coating of epoxy polyamide and a coating of polyurethane on said primer coating.

18. Apparatus as claimed in claim 16 wherein said manifold is a stainless steel block having a bore extending therethrough and a plurality of parallel bores extending from the first said bore.

19. Apparatus as claimed in claim 10 comprising a primer coating of epoxy polyamide on said block and a coating of polyurethane on said primer coating.

20. A communication system comprising a central station including a source of pressurized air; a plurality of underground cables extending from said station and coupled to said source whereby to be supplied with pressurized air to prevent the penetration of moisture, airline coupled to said source and extending adjacent said cables, a series of manifolds in said airline at positions spaced therealong, connecting hoses extending from said manifolds to respective of the underground cables to replenish the pressure in the same, and check valve means in the connecting hoses to prevent reverse flow from any of the underground cables into the manifold.

21. A system as claimed in claim 20 wherein said valve means includes in each connecting hose a valve responsive to excess of pressure in the associated underground cable relative to the pressure in the corresponding connecting hose to seal off the underground cable with respect thereto.

22. A system as claimed in claim 21 wherein said excess of pressure is, with respect to each communication system cable from about ¼ to 10 psig.

23. A system as claimed in claim 22 wherein said excess of pressure is from ¼ to ¾ psig.

24. A system as claimed in claim 21 wherein said excess of pressure is ½ ± ⅛ psig.

25. A system as claimed in claim 21 wherein said connecting hoses are armoured hoses.

26. A system as claimed in claim 21 wherein said connecting hoses include proximal ends adjacent said manifold means and distal ends to which said valves are connected, said valves being located adjacent their respective communication system underground cables.

27. A system as claimed in claim 21 wherein each said manifold includes a primer coating of epoxy polyamide and a coating of polyurethane on said primer coating.

28. A system as claimed in claim 21 wherein each said manifold is a stainless steel block having a bore extending therethrough and a plurality of parallel bores extending from the first said bore.

* * * * *